United States Patent
Lin et al.

(10) Patent No.: US 12,142,747 B2
(45) Date of Patent: Nov. 12, 2024

(54) HEAT-EXCHANGING COMPONENT, METHOD FOR MANUFACTURING HEAT-EXCHANGING COMPONENT, SYSTEM OF MANUFACTURING HEAT-EXCHANGING COMPONENT, BATTERY AND ELECTRICITY-CONSUMING APPARATUS

(71) Applicant: Contemporary Amperex Technology Co., Limited, Ningde (CN)

(72) Inventors: Jiubiao Lin, Ningde (CN); Libing Chan, Ningde (CN); Chunhui Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 490 days.

(21) Appl. No.: 17/565,482

(22) Filed: Dec. 30, 2021

(65) Prior Publication Data

US 2023/0035503 A1 Feb. 2, 2023

Related U.S. Application Data

(63) Continuation of application No. PCT/CN2021/109407, filed on Jul. 29, 2021.

(51) Int. Cl.
*H01M 10/6554* (2014.01)
*H01M 10/04* (2006.01)
(Continued)

(52) U.S. Cl.
CPC ... *H01M 10/6554* (2015.04); *H01M 10/0481* (2013.01); *H01M 10/613* (2015.04);
(Continued)

(58) Field of Classification Search
CPC .......... H01M 10/6554; H01M 10/613; H01M 10/625; H01M 10/6556; H01M 10/6568;
(Continued)

(56) References Cited

U.S. PATENT DOCUMENTS

2013/0014923 A1* 1/2013 Girmscheid ...... H01M 10/6556
165/168
2016/0036104 A1* 2/2016 Kenney .................... F28F 3/12
165/170
(Continued)

FOREIGN PATENT DOCUMENTS

CN 205376689 U 7/2016
CN 206040780 U 3/2017
(Continued)

OTHER PUBLICATIONS

Machine Translation of WO-2018088655-A1 (Aug. 27, 2024) (Year: 2024).*
(Continued)

*Primary Examiner* — Matthew J Merkling
(74) *Attorney, Agent, or Firm* — East IP P.C.

(57) ABSTRACT

The present application provides a heat-exchanging component, a method for manufacturing the heat-exchanging component, a system of manufacturing the heat-exchanging component, a battery and an electricity-consuming apparatus. The heat-exchanging component provided by the embodiments of the present application includes a first plate body and two second plate bodies. The first plate body includes a first main body, a first convex portion and a second convex portion, and the first convex portion and the second convex portion protrude from a surface of the first main body away from the accommodating space; in a thickness direction of the first main body, a size of the first convex portion protruding from the first main body is smaller than a size of the second convex portion protruding (Continued)

from the first main body; the first flow passage is formed inside the first convex portion.

19 Claims, 6 Drawing Sheets

(51) Int. Cl.
*H01M 10/613* (2014.01)
*H01M 10/625* (2014.01)
*H01M 10/6556* (2014.01)
*H01M 10/6568* (2014.01)
*H01M 50/209* (2021.01)
*H01M 50/249* (2021.01)
*H01M 50/264* (2021.01)

(52) U.S. Cl.
CPC ..... *H01M 10/625* (2015.04); *H01M 10/6556* (2015.04); *H01M 10/6568* (2015.04); *H01M 50/209* (2021.01); *H01M 50/249* (2021.01); *H01M 50/264* (2021.01); *H01M 2220/20* (2013.01)

(58) Field of Classification Search
CPC ........... H01M 10/0481; H01M 50/249; H01M 50/209; H01M 50/264
See application file for complete search history.

(56) References Cited

U.S. PATENT DOCUMENTS

| | | | | |
|---|---|---|---|---|
| 2018/0215282 | A1* | 8/2018 | Pohl | B60L 58/26 |
| 2020/0161606 | A1 | 5/2020 | Yu et al. | |
| 2020/0227701 | A1* | 7/2020 | Suzuki | H01M 10/6555 |
| 2021/0184303 | A1* | 6/2021 | Lee | H01M 50/276 |
| 2022/0123425 | A1* | 4/2022 | Gu | H01M 50/367 |
| 2022/0181743 | A1* | 6/2022 | Lim | H01M 50/233 |
| 2023/0170554 | A1* | 6/2023 | Ye | B60K 1/04 429/120 |

FOREIGN PATENT DOCUMENTS

| | | | |
|---|---|---|---|
| CN | 207247961 U | 4/2018 | |
| CN | 209104236 U | 7/2019 | |
| CN | 209104242 U | 7/2019 | |
| CN | 209401679 U | 9/2019 | |
| CN | 111192984 A | 5/2020 | |
| CN | 111883698 A | 11/2020 | |
| CN | 112310535 A | 2/2021 | |
| CN | 212967867 U | 4/2021 | |
| DE | 102017211286 A1 * | 1/2019 | |
| EP | 3654443 A1 | 5/2020 | |
| KR | 20150081514 A | 7/2015 | |
| KR | 20180069989 A | 6/2018 | |
| KR | 20190032843 A | 3/2019 | |
| KR | 20200136229 A | 12/2020 | |
| KR | 20210077415 A | 6/2021 | |
| WO | WO-2018088655 A1 * | 5/2018 | .......... H01M 10/613 |

OTHER PUBLICATIONS

Machine Translation of DE-102017211286-A1 (Aug. 27, 2024) (Year: 2024).*
The extended European search report for European Application No. 21797927.7, dated Feb. 2, 2023, 7 pages.
The International search report for PCT Application No. PCT/CN2021/109407, dated Apr. 25, 2022, 14 pages.
The First Office Action for KR Application No. 10-2021-7036578, dated Jan. 9, 2024, 21 pages.
The Grant Notification for CN Application No. 202180002675.8, dated Oct. 28, 2023, 7 pages.

* cited by examiner

HEAT-EXCHANGING COMPONENT, METHOD FOR MANUFACTURING HEAT-EXCHANGING COMPONENT, SYSTEM OF MANUFACTURING HEAT-EXCHANGING COMPONENT, BATTERY AND ELECTRICITY-CONSUMING APPARATUS

CROSS REFERENCE TO RELATED APPLICATION

The present application is a continuation of International Application No. PCT/CN2021/109407, filed on Jul. 29, 2021, which is hereby incorporated by reference in its entirety.

TECHNICAL FIELD

The present application relates to a technical filed of batteries, and specifically relates to a heat-exchanging component, a method for manufacturing the heat-exchanging component, a system of manufacturing the heat-exchanging component, a battery and an electricity-consuming apparatus.

BACKGROUND

A battery cell is widely used in an electronic apparatus, such as a mobile phone, a laptop computer, a battery car, an electric car, an electric airplane, an electric ship, an electric toy car, an electric toy ship, an electric toy airplane, an electric tool and so on. The battery cell may include a nickel-cadmium battery cell, a nickel-hydrogen battery cell, a lithium ion battery cell, and a secondary alkaline zinc-manganese battery cell.

A battery usually includes a plurality of battery cells, and the plurality of battery cells are electrically connected by a bus member. Each of the battery cells generates heat during operation. Therefore, the heat generated by the plurality of battery cells of the battery is likely to accumulate, resulting in increasing the temperature of the battery cells. In the case that an operating temperature of the battery cells is generally in the range of 20-40 degrees, a charge-and-discharge performance of the battery cells is the best, and the operating life of the battery cells is the longest. How to control the operating temperature of the battery cells in the battery within an appropriate range is a technical problem that needs to be solved urgently in a technology filed of the battery.

SUMMARY

The present application provides a heat-exchanging component, a method for manufacturing the heat-exchanging component, a system of manufacturing the heat-exchanging component, a battery and an electricity-consuming apparatus, which can improve the heat-exchanging effect and make a battery cell of the battery work at the appropriate temperature.

In a first aspect, a heat-exchanging component for a battery is provided by the embodiments of the present application, the heat-exchanging component includes:
a first plate body, in which a first flow passage for a heat-exchanging medium to flow therein is formed inside the first plate; and
two second plate bodies, in which the two second plate bodies are respectively connected to two ends of the first plate body in a first direction, a predetermined angle is formed between each of the second plate bodies and the first plate body, and an accommodating space is enclosed by the first plate body and the two second plate bodies;
herein the first plate body includes a first main body, a first convex portion and a second convex portion, and the first convex portion and the second convex portion protrude from a surface of the first main body away from the accommodating space; in a thickness direction of the first main body, a size of the first convex portion protruding from the first main body is smaller than a size of the second convex portion protruding from the first main body; the first flow passage is formed inside the first convex portion.

In the above embodiments, the heat-exchanging medium flows in the first flow passage to exchange heat with the battery cell through the first plate body, so that the battery cell can work at the appropriate temperature. In the embodiments, by providing the first convex portion, a partial thickness of the first plate body can increase, more space can be provided for the first flow passage, a flow area of the first flow passage can increase, and the heat exchange efficiency can be improved. The first convex portion protrudes toward a side away from the accommodating space, so that the flow area of the first flow passage can increase while avoiding the first flow passage from occupying the accommodating space. Since the size of the first convex portion protruding from the first main body is smaller than the size of the second convex portion protruding from the first main body, when the heat-exchanging component is placed on a load-bearing structure, the second convex portion will press against the load-bearing structure, and a gap is formed between the first convex portion and the load-bearing structure. The gravitational load of a plurality of battery cells will be transferred to the load-bearing structure through the second convex portion, so that it can reduce a force on the first convex portion, reduce the risk of deformation and blockage of the first flow passage, and ensure the heat exchange efficiency of the heat-exchanging component.

In some embodiments, the first plate body includes a first base layer and a second base layer, and the second base layer is located at a side of the first base layer away from the accommodating space and attached to the first base layer. The first convex portion is formed on the second base layer, and inside the first convex portion, the first flow passage is formed between the first base layer and the second base layer. At a position where the second convex portion is formed, the first base layer is attached to the second base layer, the second base layer protrudes from a surface of the first main body away from the accommodating space, and the first base layer is recessed toward the second base layer to form a concave portion.

In the above embodiments, at the second convex portion, the first base layer and the second base layer are laminated together, so that it can ensure the strength of the second convex portion, enable the second convex portion to bear a greater load, reduce the deformation of the second convex portion, and reduce the risk of the compression of the first convex portion.

In some embodiments, each of the second plate bodies includes a third base layer and a fourth base layer, and the fourth base layer is located at a side of the third base layer away from the accommodating space and attached to the third base layer. The first base layer and the third base layer are integrally formed by a first plate, and the second base layer and the fourth base layer are integrally formed by a second plate.

In the above embodiments, the heat-exchanging component can be formed from the first plate and the second plate, so that it not only can facilitate the formation of the first flow passage, but also increase the connection strength between the first plate and the second plate, and improve the overall structural strength of the battery.

In some embodiments, a second flow passage for the heat exchange medium flowing is formed between the third base layer and the fourth base layer, and the second flow passage communicates with the first flow passage.

In some embodiments, in a second direction, at least part of the first plate body protrudes from the second plate bodies and is configured to mount a joint communicating with the first flow passage, and the second direction is perpendicular to a thickness direction of the first main body and intersects with the first direction.

In the above embodiments, the joint is mounted on the part of the first plate body protruding from the second plate bodies, so that the risk of the interference between the second plate bodies and an external liquid supply pipeline can be reduced, and the arrangement of the external liquid supply pipeline can be more flexible.

In some embodiments, a second flow passage for the heat-exchanging medium to flow therein is formed inside the second plate bodies.

In the above embodiments, the first plate can exchange heat with the battery cells from below, and the second plate bodies can exchange heat with the battery cells from the sides, so that it can increase the heat exchange area of the battery cells, improve the heat exchange efficiency, reduce the temperature difference of the battery cells in a thickness direction of the first plate body, improve the consistency of the temperature of the battery cells, and improve the working performance of the battery cells.

In some embodiments, an accommodating concave portion is arranged at a side of each of the second plate bodies facing to the accommodating space, the heat-exchanging component further includes a heat-exchanging tube accommodated in the accommodating concave portion, and a second flow passage is formed inside the heat-exchanging tube.

In some embodiments, the second flow passage communicates with the first flow passage.

In the above embodiments, the first flow passage can communicate with the second flow passage, thus, there is no need to separately connect the first flow passage and the second flow passage to the external liquid supply pipeline, thereby simplifying the connection structure between the heat-exchanging component and the external liquid supply pipeline.

In some embodiments, the first flow passage communicates with the second flow passage at a junction between the first plate body and each of the second plate bodies; or the heat-exchanging component further includes a connecting pipeline for communicating the first flow passage with the second flow passage.

In some embodiments, each of the second plate bodies includes a second main body, a third convex portion and a fourth convex portion, and the third convex portion and the fourth convex portion protrude from a surface of the second main body away from the accommodating space; in a thickness direction of the second main body, a size of the third convex portion protruding from the second main body is smaller than a size of the fourth convex portion protruding from the second main body. The second flow passage is formed inside the third convex portion.

In the above embodiments, by providing the third convex portion, a partial thickness of each of the second plate bodies can increase, more space can be provided for the second flow passage, the flow area of the second flow passage can increase, and the heat exchange efficiency can be improved. The third convex portion protrudes toward the side away from the accommodating space, so that the flow area of the second flow passage can increase while avoiding the second flow passage from occupying the accommodating space. Since a size of the third convex portion protruding from the second main body is smaller than a size of the fourth convex portion protruding from the second main body, when the battery is shaken, the fourth convex portion can serve as a stopper, reduce the possibility of components at the outside of the second plate bodies pressing the third convex portion and reduce the risk of deformation and blockage of the second flow passage.

In a second aspect, a battery provided by the embodiments of the present application includes:
- the heat-exchanging component according to any one of the embodiments in the first aspect; and
- a battery unit, in which at least part of the battery unit is accommodated in the accommodating space of the heat-exchanging component, the battery unit includes a plurality of battery cells sequentially arranged in an arranging direction, the heat-exchanging component is configured to adjust a temperature of the battery cells, and the arranging direction intersects with the first direction.

In some embodiments, the two end plates are respectively located at two ends of the battery unit in the arranging direction, and clamp and hold the battery unit; two ends of each of the end plates in the first direction are respectively connected to the two second plate bodies.

In the above embodiments, the heat-exchanging component is connected to the end plates through the second plate bodies, so that it can improve the stability of the first plate body and reduce the risk of separation between the first plate body and the battery cells when the battery is shaken.

In some embodiments, the end plates are located between the two second plate bodies; in the arranging direction, part of the first plate body protrudes to outside of the end plates and is configured to mount the joint communicating with the first flow passage.

In the above embodiments, the joint is mounted at the outside of the end plates, so an external liquid supply pipeline does not need to pass through the end plates, so that it can simplify the structure of the battery and make the arrangement of the external liquid supply pipeline more flexible.

In some embodiments, the battery further includes a support component, herein the support component includes a support portion located at a side of the first plate body away from the accommodating space, and the support portion is connected to the first plate body. The second convex portion is pressed against the support portion, and the support portion is spaced apart from the first convex portion.

In the above embodiments, the support portion is arranged to be spaced apart from the first convex portion. Therefore, the gravitational loads of the battery cells, end plates and the like are transmitted to the support portion through the second convex portion instead of being transmitted to the support portion through the first convex portion, so that it can reduce the force on the first convex portion and reduce the risk of deformation and blockage of the first flow passage.

In some embodiments, a buffering layer is arranged between the support portion and the first convex portion, and the buffering layer is connected to the support portion and the first convex portion.

In the above embodiments, the buffering layer can improve the connection strength between the heat-exchanging component and the support portion. In addition, the buffering layer can also serve as a buffering role when the battery shakes, thereby reducing the force on the first convex portion, and reducing the risk of deformation and blockage of the first flow passage.

In some embodiments, the support component further includes two position-limiting portions, the two position-limiting portions are located at a side of the support portion facing to the heat-exchanging component and connected to the support portion, and in the first direction, the two second plate bodies are located between the two position-limiting portions.

In the above embodiments, the position-limiting portions can restrict the heat-exchanging component and the battery unit from two sides in the first direction. When the battery is shaken, the position-limiting portions can reduce the shaking amplitude of the heat-exchanging component and the battery unit, and improve the stability of the overall battery.

In some embodiments, each of the second plate bodies includes a second main body, a third convex portion and a fourth convex portion, and the third convex portion and the fourth convex portion protrude from a surface of the second main body away from the accommodating space. In a thickness direction of the second main body, a size of the third convex portion protruding from the second main body is smaller than a size of the fourth convex portion protruding from the second main body, so that the fourth convex portion is pressed against the position-limiting portion. A second flow passage is formed inside the third convex portion.

In the above embodiments, the two position-limiting portions clamp and hold the heat-exchanging component from two sides through the fourth convex portion, so as to increase the connecting strength between the heat-exchanging component and the support component and improve the stability.

In a third aspect, an electricity-consuming apparatus provided by the embodiments of the present application includes the battery according to any one of embodiments in the second aspect; herein the battery is configured to supply electric power.

In a fourth aspect, a method for manufacturing a heat-exchanging component provided by the embodiments of the present application includes:
  providing a first plate body, in which the first plate body includes a first main body, a first convex portion and a second convex portion, and the first convex portion and the second convex portion protrude from a surface of the first main body; in a thickness direction of the first main body, a size of the first convex portion protruding from the first main body is smaller than a size of the second convex portion protruding from the first main body; the first flow passage is formed inside the first convex portion;
  providing two second plate bodies, in which a first flow passage for a heat-exchanging medium to flow therein is formed inside the first plate;
  herein a predetermined angle is formed between each of the second plate bodies and the first plate body, an accommodating space is enclosed by the first plate body and the two second plate bodies, and the first convex portion and the second convex portion protrude from a surface of the first main body away from the accommodating space.

In a fifth aspect, a system of manufacturing a heat-exchanging component provided by the embodiments of the present application includes:
  a first providing device for providing a first plate body, in which the first plate body includes a first main body, a first convex portion and a second convex portion, and the first convex portion and the second convex portion protrude from a surface of the first main body; in a thickness direction of the first main body, a size of the first convex portion protruding from the first main body is smaller than a size of the second convex portion protruding from the first main body; the first flow passage is formed inside the first convex portion;
  a second providing device for providing two second plate bodies, in which a first flow passage for a heat-exchanging medium to flow therein is formed inside the first plate;
  herein a predetermined angle is formed between each of the second plate bodies and the first plate body, an accommodating space is enclosed by the first plate body and the two second plate bodies, and the first convex portion and the second convex portion protrude from a surface of the first main body away from the accommodating space.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

Figure 1:
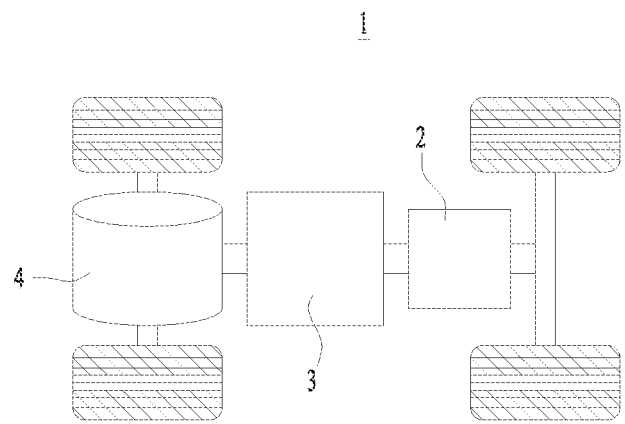
FIG. 1 shows a structural schematic view of a vehicle according to some embodiments of the present application.

In the drawings, the drawings are not drawn to actual scale.

DETAILED DESCRIPTION

In order to make the objects, technical solutions and advantages of the embodiments of the present application more clear, the technical solutions of the embodiments of the present application will be clearly and completely described below in conjunction with the drawings of the embodiments of the present application. It is apparent that the described embodiments are a part of the embodiments of the present application, and not all of them. Based on the described embodiments of the present application, all other embodiments obtained by those skilled in the art fall within the scope of the application.

Unless otherwise defined, technical terms or scientific terms used in the present disclosure should be interpreted according to common meanings thereof as commonly understood by those of ordinary skills in the art. The terms used in the description in the present application are only for the purpose of describing specific embodiments and are not intended to limit the present application. The terms "including" and "having" in the description and the claims of the present application and the above description of the drawings, and any variations thereof are intended to cover non-exclusive inclusions. The terms "first", "second", etc. in the description and the claims of the present application or the above-mentioned drawings are used to distinguish different objects, rather than to describe a specific order or a primary-secondary relationship.

The "embodiments" referred in the present application means that specific features, structures or characteristics described in conjunction with the embodiments may be included in at least one embodiment of the present application. This word appeared in various places in the description does not necessarily refer to the same embodiment, nor is it an independent or alternative embodiment mutually exclusive with other embodiments.

In the description of the present application, it should be noted that, unless otherwise clearly specified and limited, the terms "mount", "connecting" and "connection" and "attach" should be understood in a broad sense, for example, it can be a fixed connection, a detachable connection, or an integral connection, it can be connected directly, it can be connected indirectly through an intermedium, or it can be a communication between two elements at insides thereof. For those of ordinary skill in the art, the specific meaning of the above-mentioned terms in the present application can be understood according to specific situations.

The term "and/or" in the present application is merely an association relationship describing associated objects, which means that there can be three types of relationships. For example, "A and/or B" can mean three cases that there is only A, there are A and B at the same time, and there is only B. In addition, the punctuation mark "I" in the present application generally indicates that the related objects of the preceding content and following content are in an "or" relationship.

In the embodiments of the present application, the same reference numerals denote the same components, and for the sake of brevity, in different embodiments, detailed descriptions of the same components are omitted. It should be understood that the thickness, length, width and other dimensions of the various components in the embodiments of the present application shown in the drawings, as well as the overall thickness, length and width, etc., of the integrated device are only exemplary descriptions, and should not constitute any limitation to the present application.

The "plurality" in the present application refers to two or more (including two).

In the present application, a battery cell may include a lithium ion secondary battery cell, a lithium ion primary battery cell, a lithium sulfur battery cell, a sodium lithium ion battery cell, a sodium ion battery cell or a magnesium ion battery cell, etc., which is not limited in the embodiment of the present application. The battery cell can be in a shape of cylinder, flat shape, rectangular, or other shapes, which is not limited in the embodiments of the present application. There are generally three types of the battery cell in terms of packaging manners: cylindrical battery cell, square battery cell, and soft-packed battery cell, which are not limited in the embodiments of the present application.

A battery mentioned in the embodiments of the present application refers to a single physical module that includes one or more battery cells to provide higher voltage and capacity. The battery generally includes a housing for packaging one or more battery cells. The housing can prevent liquid or other foreign objects from affecting the charging or discharging of the battery cells.

The battery cell includes an electrode assembly and an electrolyte, and the electrode assembly includes a positive electrode sheet, a negative electrode sheet and a separator. The battery cell mainly relies on the movement of metal ions between the positive electrode sheet and the negative electrode sheet to work. The positive electrode sheet includes a positive electrode current collector and a positive electrode active material layer. The positive electrode active material layer coats on a surface of the positive electrode current collector. The positive electrode current collector includes a positive electrode current collecting portion and a positive electrode tab protruding from the positive electrode current collecting portion. The positive electrode current collecting portion is coated with the positive electrode active material layer, and at least part of the positive electrode tab is not coated with the positive electrode active material layer. Taking a lithium ion battery as an example, a material of the positive electrode current collector may be aluminum, the positive electrode active material layer includes a positive electrode active material, and the positive electrode active material may be lithium cobaltate, lithium iron phosphate, ternary lithium, lithium manganite or the like. The negative electrode sheet includes a negative electrode current collector and a negative electrode active material layer. The negative electrode active material layer coats on a surface of the negative electrode current collector. The negative electrode current collector includes a negative electrode current collecting portion and a negative electrode tab protruding from the negative electrode current collecting portion. The negative electrode current collecting portion is coated with the negative electrode active material layer, and at least part of the negative electrode tab is not coated with the negative electrode active material layer. A material of the negative electrode current collector may be copper, the negative electrode active material layer includes the negative electrode active material, and the negative electrode active material may be carbon or silicon, etc. In order to ensure that a large current is passed without fusing, the number of the positive electrode tabs is multiple, and the positive electrode are stacked together; the number of the negative electrode tabs is multiple, and the negative electrode tabs are stacked together. A material of the separator may be PP (polypropylene) or PE (polyethylene), etc. In addition, the electrode assembly may be a winding-type structure or a laminated-type structure, which is not limited in the embodiments of the present application.

The battery cell may generate heat during a process of charging and discharging. When a plurality of battery cells are used in sets, the heat may gather together. If the heat is not removed effectively, it will cause a temperature of the battery cells to rise and the aging of the battery cells to be accelerated. In addition, the too high temperature may easily cause the runaway heat, and cause the safety risk. When the battery cells are in a low temperature environment, the operation life will be shortened and the discharge capacity will be weakened.

The inventor tried to arrange a heat-exchanging component in the battery to control an operating temperature of the battery cells within an appropriate range. Specifically, a flow passage is usually formed inside the heat-exchanging component. When an external heat exchange media flows through the flow passage of the heat-exchanging component, a heat-exchanging medium exchanges heat with the battery cells through the heat-exchanging component to adjust the temperature of the battery cells. However, the inventor found that when the heat-exchanging component is arranged at a lower side of the battery cells, the heat-exchanging component needs to bear the gravitational load of the battery cells; part of the heat-exchanging component arranged in a flow passage is a hollow structure, which is easily deformed when pressed, causing the risk of blockage of the flow passage.

In view of these, the heat-exchanging component for a battery provided by the embodiments of the present application includes: a first plate body, in which a first flow passage for a heat-exchanging medium to flow therein is formed inside the first plate; and two second plate bodies, in which the two second plate bodies are respectively connected to two ends of the first plate body in a first direction, a predetermined angle is formed between each of the second plate bodies and the first plate body, and an accommodating space is enclosed by the first plate body and the two second plate bodies. Herein the first plate body includes a first main body, a first convex portion and a second convex portion, and the first convex portion and the second convex portion protrude from a surface of the first main body away from the accommodating space; in a thickness direction of the first main body, a size of the first convex portion protruding from the first main body is smaller than a size of the second convex portion protruding from the first main body. The first flow passage is formed inside the first convex portion. The heat-exchanging component of the embodiments in the present application can adjust the temperature of the battery cells, reduce the load carried by the flow passage, and reduce the risk of deformation and blockage of the flow passage.

The heat-exchanging component described in the embodiments of the present application is suitable for the battery and an electricity-consuming apparatus applying the battery.

The Electricity-consuming apparatus may be a vehicle, a mobile phone, a portable device, a notebook computer, a ship, a spacecraft, an electric toy, an electric tool or the like. The vehicle may be a fuel car, a gas car or a new energy car, and the new energy car can be a pure electric car, a hybrid car, a range-extended car or the like; the spacecraft may include an airplane, a rocket, a space shuttle, a space ship or the like; the electric toy may include a fixed-type or mobile-type electric toy, such as a game player, an electric car toy, an electric ship toy, an electric airplane toy or the like; the power tool may include a metal cutting power tool, a grinding power tool, an assembly power tool and a railway power tools, such as an electric drill, an electric grinder, an electric wrench, an electric screwdriver, an electric hammer, an impact drill, a concrete vibrator, an electric planers or the like. The embodiments of the present application do not impose special limitation on the above-mentioned electricity-consuming apparatuses.

For convenience of description, the following embodiments take the vehicle selected from the electricity-consuming apparatus as an example for description.

FIG. 1 shows a structural schematic view of the vehicle according to some embodiments of the present application. As shown in FIG. 1, the battery 2 is arranged inside the vehicle 1, and the battery 2 may be arranged at a bottom, a head or a tail of the vehicle 1. The battery 2 may be used for the power supply of the vehicle 1, for example, the battery 2 may be used as an operating power source of the vehicle 1.

The vehicle 1 may further include a controller 3 and a motor 4, and the controller 3 is configured to control the battery 2 to supply power to the motor 4, for example, for the working-power requirements of the vehicle 1 during starting, navigating and driving.

In some embodiments of the present application, the battery 2 can be used not only as the operating power source for the vehicle 1, but also as a driving power source for the vehicle 1, replacing or partially replacing fuel or natural gas to provide the driving power to the vehicle 1.

Figure 2:
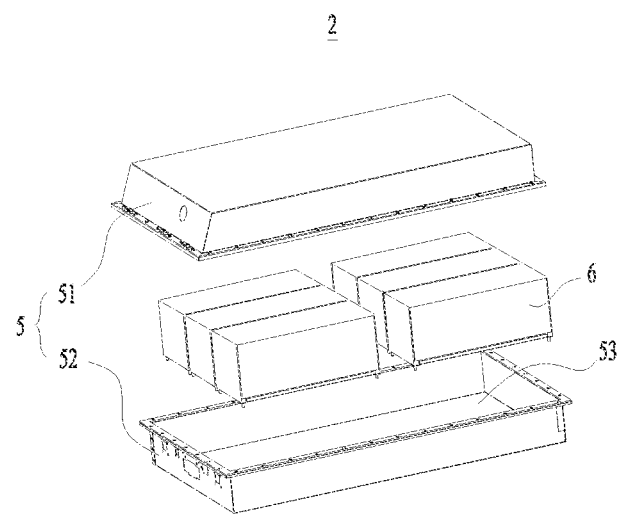
FIG. 2 shows an exploded schematic view of a battery according to some embodiments of the present application.

FIG. 2 shows an exploded schematic view of the battery according to some embodiments of the present application.

As shown in FIG. 2, the battery 2 includes the housing 5 and the battery cells (not shown in FIG. 2), and the battery cells are contained in the housing 5.

The housing 5 is configured to accommodate the battery cells, and the housing 5 can be of various structures. In some embodiments, the housing 5 may include a first housing portion 51 and a second housing portion 52, the first housing portion 51 and the second housing portion 52 are covered and closed to each other, an accommodating space 53 for accommodating the battery cells are defined by the first housing portion 51 and the second housing portion 52 together. The second housing portion 52 may be of a hollow structure with an opening at an end thereof, the first housing portion 51 is of a plate-shaped structure, and the first housing portion 51 covers and closes at an opening side of the second housing portion 52 to form the housing 5 with the accommodation space 53; or each of the first housing portion 51 and the second housing portion 52 may be of a hollow structure with an opening at a side, an opening side of the first housing portion 51 is covered and closed by an opening side of the second housing portion 52 to form the housing 5 with the accommodating space 53. Certainly, the first housing portion 51 and the second housing portion 52 may be of various shapes, such as a cylinder, a rectangular parallelepiped or the like.

In order to improve the sealing performance after the first housing portion 51 and the second housing portion 52 are connected, a sealing member, such as a sealant, a sealing ring or the like, may also be arranged between the first housing portion 51 and the second housing portion 52.

Assuming that the first housing portion 51 covers and closes on a top of the second housing portion 52, the first housing portion 51 can also be referred to as an upper housing cover, and the second housing portion 52 can also be referred to as a lower housing.

In the battery 2, there are a plurality of battery cells. The plurality of battery cells can be connected in series or in parallel or in hybrid. A hybrid connection means that the plurality of battery cells are connected in series and in parallel. the plurality of battery cells can be directly connected in series or in parallel or in hybrid together, and then the whole composed of the plurality of battery cells can be accommodated in the housing 5; certainly, it is also possible that the plurality of battery cells are connected in series or in parallel or in hybrid to form a battery module 6, and then a plurality of battery modules 6 are connected in series or in parallel or in hybrid to form a whole and accommodated in the housing 5.

Figure 3:
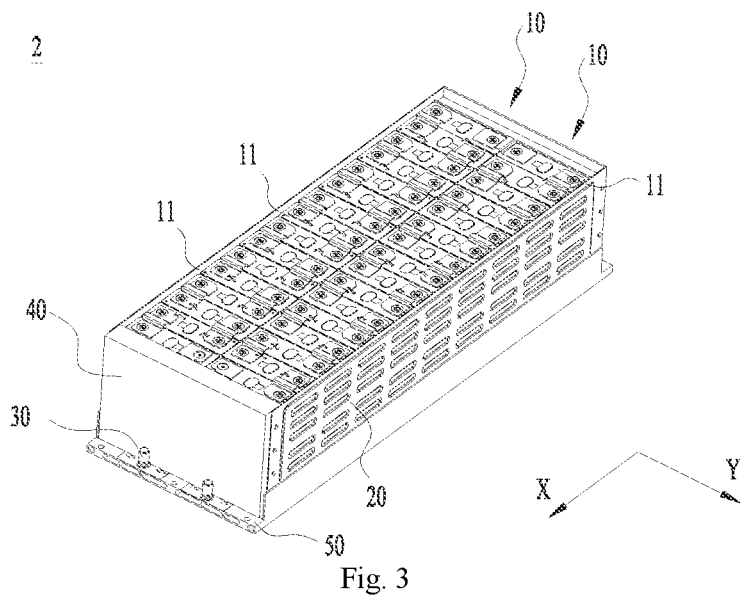
FIG. 3 shows a structural schematic view of a battery according to some other embodiments of the present application.

FIG. 3 shows a structural schematic view of the battery according to some other embodiments of the present application.

As shown in FIG. 3, in some embodiments, the battery 2 includes a battery unit 10, and the battery unit 10 includes the plurality of battery cells 11 sequentially arranged in an arranging direction X.

The battery unit 10 may be one or more. For example, the battery 2 includes the plurality of battery units 10, and the plurality of battery units 10 are arranged in the first direction Y; the first direction Y intersects with the arranging direction X. Optionally, the first direction Y is perpendicular to the arranging direction X. In FIG. 3, there are two battery units 10, in other words, the plurality of battery cells 11 are arranged in two rows.

The plurality of battery cells 11 in the battery 2 can be electrically connected by a bus member, so that the plurality of battery cells 11 in the battery 2 can be connected in parallel or in series or in hybrid.

In some embodiments, that battery 2 further includes the heat-exchanging component 20; the heat-exchanging component 20 is configured to adjust the temperature of the battery cells 11 to make the battery cells 11 work at the appropriate temperature.

Hereinafter, the heat-exchanging component 20 of the embodiments in the present application will be described in detail with reference to the drawings.

Figure 4:
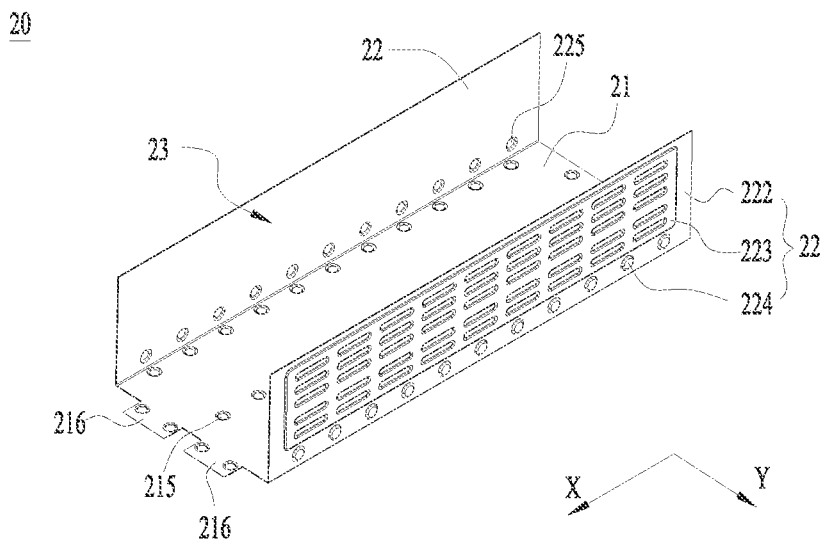
FIG. 4 shows a structural schematic view of a heat-exchanging component according to some embodiments of the present application.
Figure 5:
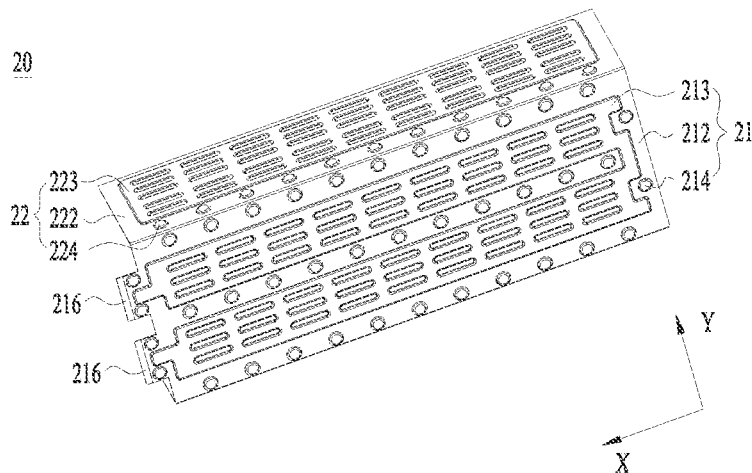
FIG. 5 shows a structural schematic view of the heat-exchanging component of FIG. 4 from another perspective.
Figure 6:
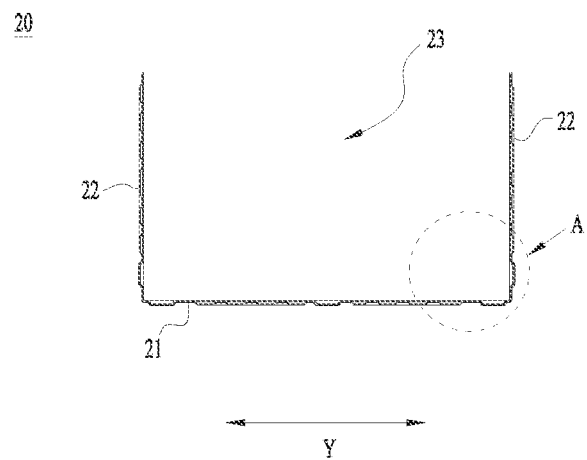
FIG. 6 is a schematic cross-sectional view of the heat-exchanging component shown in FIG. 4.
Figure 7:
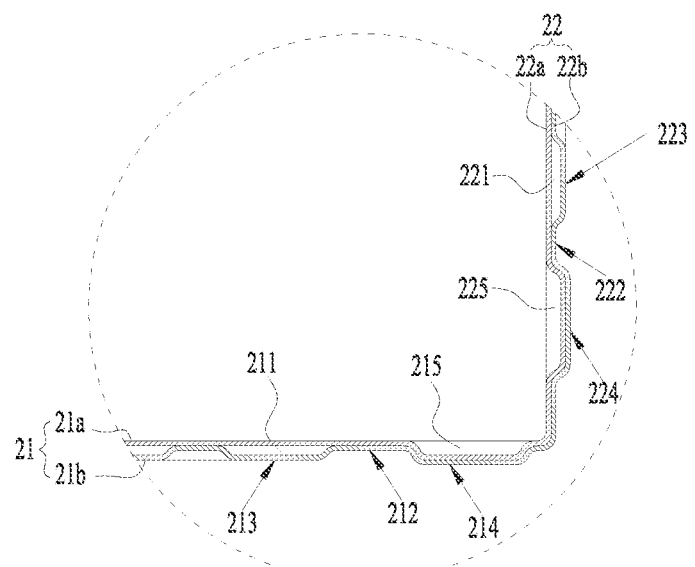
FIG. 7 is an enlarged schematic view of the heat-exchanging component shown in FIG. 6 at a circular portion A.

FIG. 4 shows a structural schematic view of a heat-exchanging component according to some embodiments of the present application; FIG. 5 shows a structural schematic view of the heat-exchanging component of FIG. 4 from another perspective; FIG. 6 is a schematic cross-sectional view of the heat-exchanging component shown in FIG. 4; and FIG. 7 is an enlarged schematic view of the heat-exchanging component shown in FIG. 6 at a circular portion A.

As shown in FIG. 3 to FIG. 7, the heat-exchanging component 20 for the battery 2 is provided by the embodiments of the present application, the heat-exchanging component 20 includes: the first plate body 21, inside which the first flow passage 211 for the heat-exchanging medium to flow therein is formed; and two second plate bodies 22, which are respectively connected to two ends of the first plate body 21 in the first direction Y, with the predetermined angle formed between each of the second plate bodies 22 and the first plate body 21, and the accommodating space 23 enclosed by the first plate body 21 and the two second plate bodies 22. Herein the first plate body 21 includes the first main body 212, the first convex portion 213 and the second convex portion 214, and the first convex portion 213 and the second convex portion 214 protrude from the surface of the first main body 212 away from the accommodating space 23; in a thickness direction of the first main body 212, the size of the first convex portion 213 protruding from the first main body 212 is smaller than the size of the second convex portion 214 protruding from the first main body 212. The first flow passage 211 is formed inside the first convex portion 213.

The accommodating space 23 of the heat-exchanging component 20 is configured to accommodate the battery unit 10. Exemplarily, in the battery 2, the first plate body 21 is located below the plurality of battery cells 11 of the battery unit 10, and the first plate body 21 is configured to support the battery cells 11 and adjust the temperature of the battery cells 11.

The first flow passage 211 is configured to communicate with an external liquid supply pipeline, and the heat-exchanging medium can circulate and flow between the first flow passage 211 and the external liquid supply pipeline to exchange heat with the battery cells 11 through the first plate body 21, so that the battery cells can word at the appropriate temperature. The heat-exchanging medium may be of liquid.

The first plate body 21 is made of a thermally conductive material, for example, the first plate body 21 is made of a thermally conductive metal.

In the embodiments, the first flow passage 211 may be formed on the first plate body 21 by means of a process such as extrusion molding, inflation molding, stamping molding or the like.

The first plate body 21 may be integrally arranged with the second plate bodies 22; for example, the first plate body 21 and the second plate bodies 22 are integrally formed by bending a plate. Certainly, the first plate body 21 and the second plate bodies 22 can be arranged separately. For example, the first plate body 21 and the second plate bodies 22 can be connected by means of welding, bonding, clamping or the like.

An angle between each of the second plate bodies 22 and the first plate body 21 can be determined as required, which is not limited in the embodiments. Exemplarily, the angle between each of the second plate bodies 22 and the first plate body 21 may be 80°-100°. The heat-exchanging component 20 is of a U-shaped structure substantially.

In the battery 2, the two second plate bodies 22 are respectively located at two sides of the battery unit 10 in the first direction Y, which can serve to fix the battery unit 10 and improve the overall strength of the battery 2. The second plate bodies 22 may also have a heat exchange function to adjust the temperature of the battery cells 11 from the sides. Certainly, the heat exchange function of the second plate bodies 22 may be omitted.

The first main body 212 is of a flat plate structure substantially, and surfaces of the first main body 212 oppositely arranged in a thickness direction of the first main body 212 are flat surfaces.

There may be one or more first convex portion 213. When there are a plurality of first convex portions 213, each of first convex portions 213 is provided with the first flow passage 211; the first flow passages 211 of the plurality of first convex portions 213 may be connected directly, or may be connected through other communication structures, such as a connecting pipeline or the like.

There may be one or more second convex portion 214. The second convex portion 214 may be circular, rectangular, racetrack-shaped, elliptical or the like.

An extent to which the second convex portion 214 protrudes from the first main body 212 is greater than an extent to which the first convex portion 213 protrudes from the first main body 212. When the heat-exchanging component 20 is placed on a load-bearing structure, the second convex portion 214 will press against the load-bearing structure and form a gap between the first convex portion 213 and the load-bearing structure.

In the embodiments of the present application, by arranging the first convex portion 213, a partial thickness of the first plate body 21 can increase to provide more space for the first flow passage 211, increase a flow area of the first flow passage 211, and improve the heat exchange efficiency. The first convex portion 213 protrudes toward a side away from the accommodating space 23, so that the flow area of the first flow passage 211 can increase while preventing the first flow passage 211 from occupying the accommodating space 23. Since the size of the first convex portion 213 protruding from the first main body 212 is smaller than the size of the second convex portion 214 protruding from the first main body 212, when the heat-exchanging component 20 is placed on the load-bearing structure, the second convex portion 214 will press against the load-bearing structure, and the gap is formed between the first convex portion 213 and the load-bearing structure; the gravitational load of the plurality of battery cells 11 will be transmitted to the load-bearing structure through the second convex portion 214, so that it can reduce the force on the first convex portion 213, reduce the risk of deformation and blockage of the first flow passage 211, and ensure the heat exchange efficiency of the heat-exchanging component 20.

In some embodiments, the first plate body 21 includes a first base layer 21a and a second base layer 21b, and the second base layer 21b is located at a side of the first base layer 21a away from the accommodating space 23 and attached to the first base layer 21a. The first convex portion 213 is formed on the second base layer 21b, and inside the first convex portion 213, the first flow passage 211 is formed between the first base layer 21a and the second base layer 21b. At a position where the second convex portion 214 is formed, the first base layer 21a is attached to the second base layer 21b, the second base layer 21b protrudes from a surface of the first main body 212 away from the accommodating space 23, and the first base layer 21a is recessed toward the second base layer 21b to form a concave portion 215.

The first convex portion 213 is a part of the second base layer 21b, and the first flow passage 211 is formed at a side of the first convex portion 213 facing to the first base layer 21a.

The first plate body 21 can be made by an inflation process. Specifically, in some embodiments, the first plate body 21 can be manufactured according to the following steps:

providing a first base plate and a second base plate, and forming a graphite path on a surface of the first base plate by means of a graphite printing method, in which a shape of the graphite path corresponds to a shape of the first flow passage 211;

attaching the second base plate to the surface of the first base plate on which the graphite path is formed, and fixing the second base plate and the first base plate to form a composite base plate;

placing the composite base plate in an inflation mold and performing the high-pressure blowing to separate the second base plate from the first base plate at the graphite path to form the first flow passage 211; in which the inflation mold may restrict the deformation of the composite base plate, so that the first base plate can keep flat, the second base plate can be deformed to form the first convex portion 213;

stamping the composite base plate from a side of the first base plate to deform the first base plate and the second base plate to form the second convex portion 214 and the concave portion 215 corresponding to the second convex portion 214.

The first base plate and the second base plate processed by the steps as described above respectively form the first base layer 21a and the second base layer 21b of the embodiments.

In the embodiments, at the second convex portion 214, the first base layer 21a and the second base layer 21b are laminated together, so that it can ensure the strength of the second convex portion 214, enable the second convex portion 214 to bear a greater load, reduce the deformation of the second convex portion 214, and reduce the risk of the compression of the first convex portion 213.

In some embodiments, a thickness of the first base layer 21a is smaller than a thickness of the second base layer 21b. In the embodiments, by reducing the thickness of the first base layer 21a, a heat-conducting path between the battery cells 11 and the heat-exchanging medium can be shortened, and the heat exchange efficiency can be improved.

In some embodiments, each of the second plate bodies 22 includes a third base layer 22a and a fourth base layer 22b, and the fourth base layer 22b is located at a side of the third base layer 22a away from the accommodating space 23 and attached to the third base layer 22a. The first base layer 21a and the third base layer 22a are integrally formed by a first plate, and the second base layer 21b and the fourth base layer 22b are integrally formed by a second plate.

The heat-exchanging component 20 can be made of the first plate and the second plate. The first plate and the second plate are flat plates at the beginning; after the first plate and the second plate are attached together, the first plate and the second plate are inflated and stamped to form the first convex portion 213 and the second convex portion 214, then the first plate and the second plate are bent.

The first plate is bent to form the first base layer 21a and the third base layer 22a, and the second plate is bent to form the second base layer 21b and the fourth base layer 22b.

In the embodiments, the heat-exchanging component 20 is made of the first plate and the second plate, which can not only facilitate the formation of the first flow passage 211, but also improve the connection strength between the first plate body 21 and the second plate bodies 22, and improve the overall structural strength of the battery 2.

In an alternative embodiment, the first base layer 21a and the third base layer 22a can be formed separately; for example, the third base layer 22a may be connected to the first base layer 21a by welding, bonding, riveting or the like. The second base layer 21b and the fourth base layer 22b can also be formed separately; for example, the fourth base layer 22b may also be connected to the second base layer 21b by welding, bonding, riveting or the like, or may not be connected to the second base layer 21b.

In some embodiments, a second flow passage 221 for the heat-exchanging medium to flow therein is formed at an inside the second plate bodies 22.

The second flow passage 221 is configured to communicate with the external liquid supply pipeline, and the heat-exchanging medium can circulate and flow between the second flow passage 221 and the external liquid supply pipeline to exchange heat with the battery cells 11 through the second plate bodies 22, so that the battery cells 11 can work at the appropriate temperature.

The second flow passage 221 may communicate with the first flow passage 211 or may not communicate with the first flow passage 211, which is not limited in the embodiments.

In the embodiments, the first plate 21 can exchange heat with the battery cells 11 from below, and the second plate bodies 22 can exchange heat with the battery cells 11 from the sides, so that it can increase the heat exchange area of the battery cells 11, improve the heat exchange efficiency, reduce the temperature difference of the battery cells 11 in a thickness direction of the first plate body 21, improve the consistency of the temperature of the battery cells 11, and improve the working performance of the battery cells 11.

In some embodiments, the second flow passage 221 communicates with the first flow passage 211.

The second flow passage 221 may directly communicate with the first flow passage 211, or may indirectly communicate with the first flow passage 211 through other components, which is not limited in the embodiments.

In the embodiments of the present application, the first flow passage 211 communicates with the second flow passage 221, thus, there is no need to separately connect the first flow passage 211 and the second flow passage 221 to the external liquid supply pipeline, thereby simplifying the connecting structure between the heat-exchanging component 20 and the external liquid supply pipeline.

In some embodiments, each of the second plate bodies 22 includes a second main body 222, a third convex portion 223 and a fourth convex portion 224, and the third convex portion 223 and the fourth convex portion 224 protrude from a surface of the second main body 222 away from the accommodating space 23. In a thickness direction of the second main body 222, a size of the third convex portion 223 protruding from the first main body 212 is smaller than a size of the fourth convex portion 224 protruding from the first main body 212. A second flow passage 221 is formed inside the third convex portion 223.

The second main body 222 is of a flat plate structure substantially, and the surfaces of the second main body 222 oppositely arranged in the thickness direction of its own can be flat surfaces.

There may be one or more third convex portions 223. When there is a plurality of third convex portions 223, the second flow passage 221 is formed in each of the third convex portions 223; the second flow passages 221 of the plurality of third convex portions 223 may directly communicate with one another, or may communicate with one another through other communication structures, such as the connecting pipeline or the like.

There may be one or more fourth convex portions 224. The fourth convex portion 224 may be circular, rectangular, racetrack-shaped, elliptical or the like.

An extent to which the fourth convex portion 224 protruding from the second main body 222 is greater than an extent to which the third convex portion 223 protruding from the second main body 222.

In the embodiments of the present application, by arranging the third convex portion 223, a partial thickness of each of the second plate bodies 22 can increase, so as to provide more space for the second flow passage 221, increase the flow area of the second flow passage 221, and improve the heat exchange efficiency. The third convex portion 223 protrudes toward the side away from the accommodating space 23, so that the flow area of the second flow passage 221 can increase while preventing the second flow passage 221 from occupying the accommodating space 23. Since the size of the third convex portion 223 protruding from the second main body 222 is smaller than the size of the fourth convex portion 224 protruding from the second main body 222, when the battery 2 is shaken, the fourth convex portion 224 can serve as a stopper; so as to reduce the possibility of a component at the outside of the second plate bodies 22 pressing the third convex portion 223, and reduce the risk of deformation and blockage of the second flow passage 221.

In some embodiments, the second flow passage 221 for the heat exchange medium flowing is formed between the third base layer 22a and the fourth base layer 22b, and the second flow passage 221 communicates with the first flow passage 211. The second flow passage 221 can also be made by the inflation process.

The third convex portion 223 is formed on the fourth base layer 22b, and inside the third convex portion 223, the second flow passage 221 is formed between the third base layer 22a and the fourth base layer 22b. At a position where the fourth convex portion 224 is formed, the third base layer 22a is attached to the fourth base layer 22b, the fourth base layer 22b protrudes from the surface of the second main body 222 away from the accommodating space 23, and the third base layer 22a is recessed toward the fourth base layer 22b to form the concave portion 225.

In the embodiments, at the fourth convex portion 224, the third base layer 22a and the fourth base layer 22b are laminated together, so that it can ensure the strength of the fourth convex portion 224, enable the fourth convex portion 224 to bear the greater load, reduce the deformation of the fourth convex portion 224, and reduce the risk of the compression of the third convex portion 223.

In some embodiments, in a second direction, at least part of the first plate body 21 protrudes from the second plate bodies 22 and is configured to mount a joint 30 communicating with the first flow passage 211, and the second direction is perpendicular to a thickness direction of the first main body 212 and intersects with the first direction Y.

Optionally, in the battery 2, the arranging direction X of the plurality of battery cells 11 of the battery unit 10 is parallel to the second direction.

The joint 30 is configured to connect to the external liquid supply pipeline. The joint 30 may include a liquid inlet joint and a liquid outlet joint, and the heat-exchanging medium flows into the first flow passage 211 through the liquid inlet joint, and then flows out through the liquid outlet joint.

Exemplarily, the first plate body 21 may include two protruding regions 216, and both the protruding regions 216 protrude from the second plate bodies 22 and are configured to mount the liquid inlet joint and the liquid outlet joint respectively. The two protruding regions 216 may be respectively located at two ends of the first plate body 21 in the second direction, or may be located at the same end of the first plate body 21 in the second direction.

In the embodiments, the joint 30 is mounted at the part of the first plate body 21 protruding from the second plate body 22, so that the risk of the interference between the second plate bodies 22 and the external liquid supply pipeline and the arrangement of the external liquid supply pipeline can be more flexible.

In an alternative embodiment, the liquid inlet joint and the liquid outlet joint can also be mounted on the two second plate bodies 22 respectively.

Figure 8:
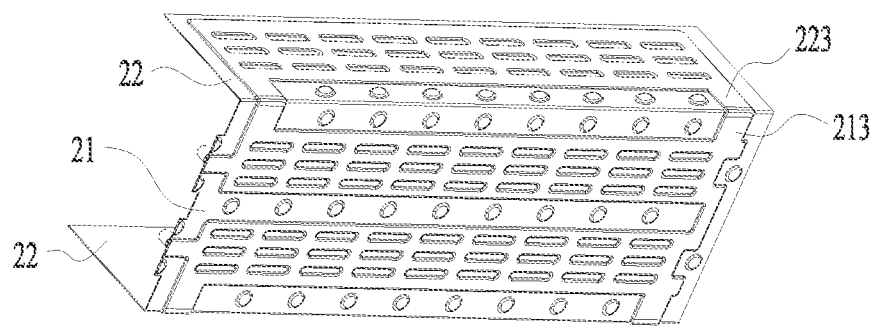
FIG. 8 shows a structural schematic view of a heat-exchanging component according to some other embodiments of the present application.

FIG. 8 shows a structural schematic view of the heat-exchanging component according to some other embodiments of the present application.

As shown in FIG. 8, in some embodiments, the first flow passage and the second flow passage communicate with each other at a junction between the first plate body 21 and each of the second plate bodies 22.

In the embodiments, the first flow passage directly communicates with the second flow passage inside the heat-exchanging component 20, and there is no need to provide other structures to communicate the first flow passage and the second flow passage, thereby simplifying the structure of the heat-exchanging component 20.

Exemplarily, in FIG. 8, the first flow passage is located inside the first convex portion 213, and the second flow passage is located inside the third convex portion 223; the first convex portion 213 is connected to the third convex portion 223, so that the first flow passage directly communicates with the second flow passage.

Figure 9:
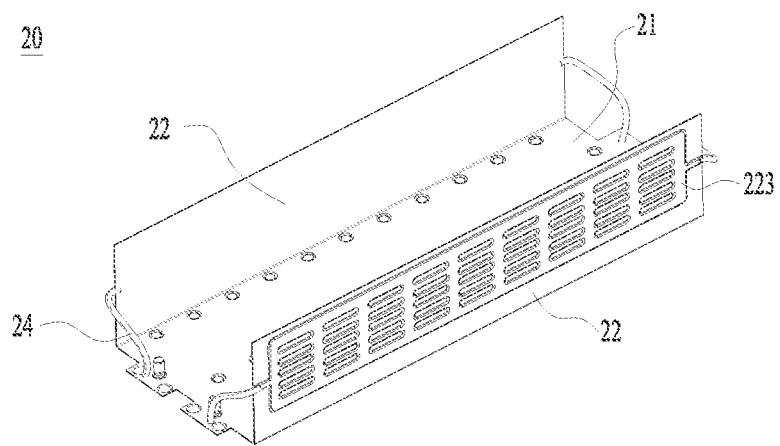
FIG. 9 shows a structural schematic view of a heat-exchanging component according to some other embodiments of the present application.

FIG. 9 shows a structural schematic view of the heat-exchanging component according to some other embodiments of the present application.

As shown in FIG. 9, in some embodiments, the heat-exchanging component 20 further includes the connecting pipeline 24, configured to communicate the first flow passage with the second flow passage.

In the embodiments, the connection between the first flow passage and the second flow passage can be made more flexible by using the connecting pipeline 24.

Exemplarily, in FIG. 9, the first flow passage is located inside the first convex portion, and the second flow passage is located inside the third convex portion 223.

Figure 10:
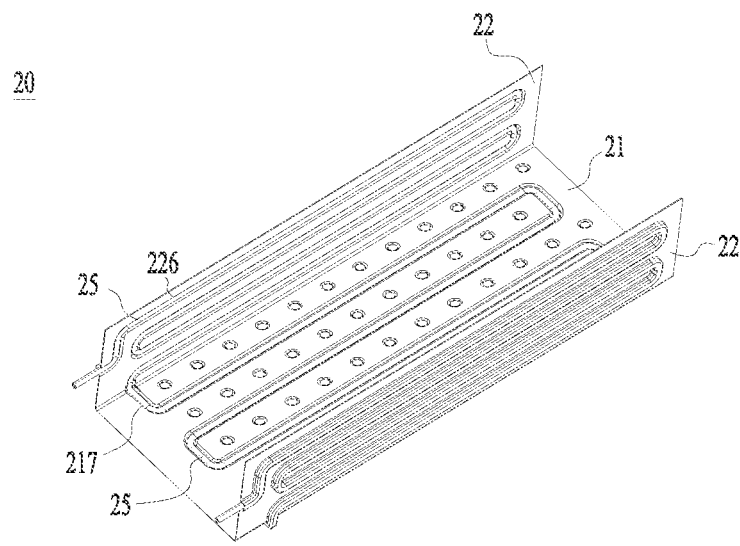
FIG. 10 shows a structural schematic view of a heat-exchanging component according to some other embodiments of the present application.

FIG. 10 shows a structural schematic view of the heat-exchanging component according to some other embodiments of the present application.

As shown in FIG. 10, in some embodiments, an accommodating concave portion is arranged at a side of each of the second plate bodies 22 facing to the accommodating space. The heat-exchanging component 20 further includes a heat-exchanging tube 25 accommodated in the accommodating concave portion, and the second flow passage is formed inside the heat-exchanging tube 25.

The heat-exchanging tube 25 is embedded in the accommodating concave portion, and the heat-exchanging tube 25 does not protrude outside the surface of the second plate bodies 22 facing to the accommodating space.

In some embodiments, the first plate body 21 is also formed with the accommodating concave portion at a side of the first convex portion 213 facing to the accommodating space. The accommodating concave portion on the first plate body 21 is referred to as a first accommodating concave portion 217, and the accommodating concave portion on the second plate bodies 22 is referred to as a second accommodating concave portion 226.

The heat-exchanging tube 25 is also arranged in the first accommodating concave portion 217, and a first flow passage is formed inside the heat-exchanging tube 25. The heat-exchanging tube 25 in the first accommodating concave portion 217 and the heat-exchanging tube 25 in the second accommodating concave portion 226 are arranged integrally.

Figure 11:
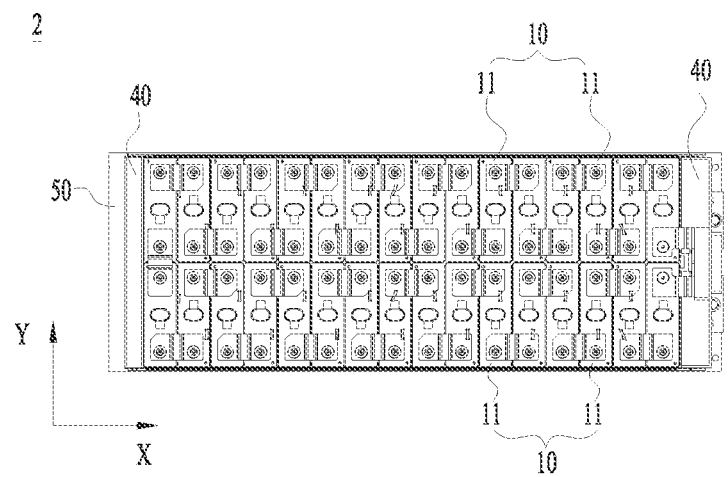
FIG. 11 shows a schematic top view of the battery shown in FIG. 3.
Figure 12:
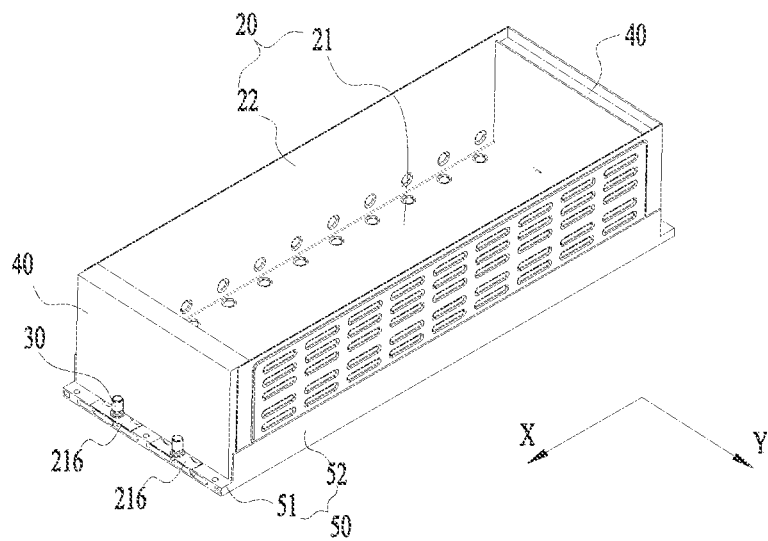
FIG. 12 shows another schematic view of the battery shown in FIG. 3, in which a battery unit is omitted.
Figure 13:
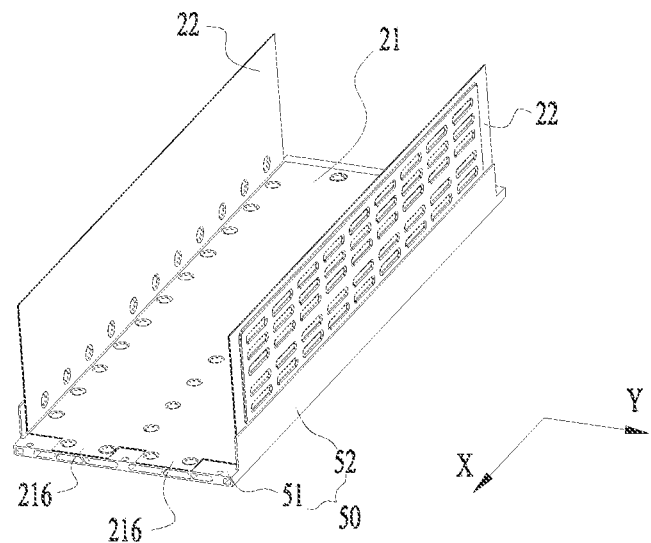
FIG. 13 shows a schematic view of assembling a heat-exchanging component and a support component of a battery according to some embodiments of the present application.
Figure 14:
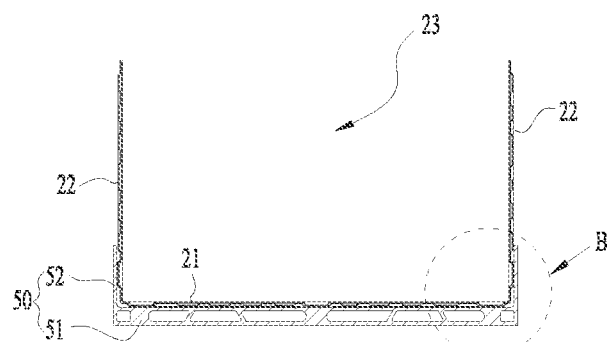
FIG. 14 shows a schematic cross-sectional view of the heat-exchanging component and the support component shown in FIG. 13.
Figure 15:
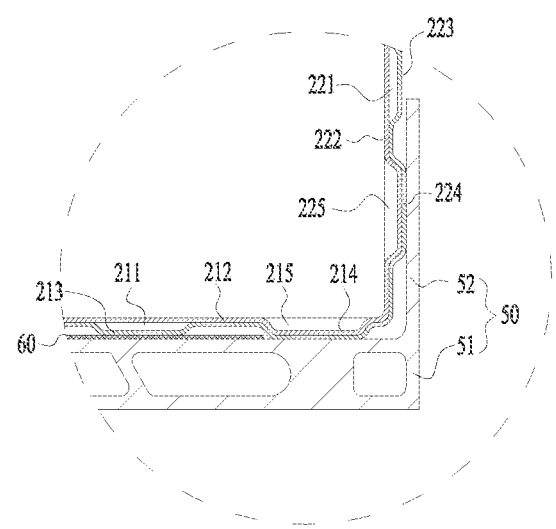
FIG. 15 shows an enlarged schematic view of FIG. 14 at a circular portion B.

FIG. 11 shows a schematic top view of the battery shown in FIG. 3; FIG. 12 shows another schematic view of the battery shown in FIG. 3, in which the battery unit is omitted;

FIG. 13 shows a schematic view of assembling the heat-exchanging component and the support component of the battery according to some embodiments of the present application;

FIG. 14 shows a schematic cross-sectional view of the heat-exchanging component and the support component shown in FIG. 13; FIG. 15 shows an enlarged schematic view of FIG. 14 at a circular portion B.

As shown in FIG. 11 to FIG. 15, the battery 2 provided by the embodiments of the present application includes the heat-exchanging component 20 and the battery unit 10; at least part of the battery unit 10 is accommodated in the accommodating space 23 of the heat-exchanging component 20, the battery unit 10 includes the plurality of battery cells 11 sequentially arranged in the arranging direction X, the heat-exchanging component 20 is configured to adjust the temperature of the battery cells 11, and the arranging direction X intersects with the first direction Y.

The battery cells 11 are connected to the heat-exchanging component 20. Optionally, the battery cells 11 are bonded to the first plate body 21 and the second plate bodies 22 by a heat-conducting glue.

In some embodiments, the battery 2 further includes two end plates 40, the two end plates 40 are respectively located at two ends of the battery unit 10 in the arranging direction X and clamp and hold the battery unit 10, and two ends of each of the end plates 40 in the first direction Y are respectively connected to the two second plate bodies 22.

The two ends of the end plate 40 in the first direction Y may be connected to the two second plate bodies 22 by welding or the like. The two end plates 40 and the two second plate bodies 22 form a frame structure to fix the battery cells 11.

In the embodiments, the heat-exchanging component 20 is connected to the end plates 40 through the second plate bodies 22, so that it can improve the stability of the first plate body and reduce the risk of the first plate body 21 being separated from the battery cells 11 when the battery 2 is shaken.

In some embodiments, the end plates 40 are located between the two second plate bodies 22. In the arranging direction X, part of the first plate body 21 protrudes to outside of the end plates 40 and is configured to mount the joint 30 communicating with the first flow passage 211.

The joint 30 is mounted at the outside of the end plates 40, thus the external liquid supply pipeline does not need to pass through the end plates 40, so that it can simplify the structure of the battery 2 and make the arrangement of the external liquid supply pipeline more flexible.

The protruding regions 216 of the first plate body 21 protrude to the outside of the end plates 40. Optionally, the two protruding regions 216 are located at the same end of the first plate body 21 and protrude to the outside of the end plates 40.

In some embodiments, the battery 2 further includes a support component 50, the support component 50 includes a support portion 51 located at a side of the first plate body 21 away from the accommodating space 23, and the support portion 51 is connected to the first plate body 21. The second convex portion 214 is pressed against the support portion 51, and the support portion 51 is arranged to be spaced apart from the first convex portion 213.

The support portion 51 is connected to the second convex portion 214. Exemplarily, the second convex portion 214 may be connected to the support portion 51 by means of riveting, bolting, welding, bonding or the like.

The support portion 51 is the load-bearing structure of the battery 2, and is configured to bear the heat-exchanging component 20, the battery cells 11, the end plates 40 and the like. The support portion 51 serves as an important role in improving the structural strength of the battery 2 and has a relatively high strength.

The support portion 51 has the relatively high strength, thus, the support portion 51 can be directly mounted on the electricity-consuming apparatus (such as the chassis of the vehicle), so that a traditional housing can be omitted, the space utilization rate can be improved, and used members can be reduced.

The support portion 51 is arranged to be spaced apart from the first convex portion 213. Therefore, the gravitational loads of the battery cells 11, end plates 40 and the like are transmitted to the support portion 51 through the second convex portion 214 instead of being transmitted to the support portion 51 through the first convex portion 213, so that it can reduce the force on the first convex portion 213 and reduce the risk of deformation and blockage of the first flow passage 211.

In some embodiments, the second convex portion 214 is arranged at the lower side of each of battery cells 11, so that the heat-exchanging component 20 can transmit the gravitational load to the support portion 51 more evenly, so as to reduce the stress concentration.

In some embodiments, a buffering layer 60 is arranged between the support portion 51 and the first convex portion 213, and the buffering layer 60 is connected to the support portion 51 and the first convex portion 213.

The buffering layer 60 can improve the connection strength between the heat-exchanging component 20 and the support portion 51. In addition, the buffering layer 60 can also serve as a buffering role when the battery 2 shakes, thereby reducing the force on the first convex portion 213, and reducing the risk of deformation and blockage of the first flow passage 211. The strength of the buffering layer 60 is relatively low, and the gravitational loads of components such as the battery cells 11 and the end plates 40 are mainly transmitted to the support portion 51 through the second convex portion 214.

In some embodiments, the buffering layer 60 is formed by curing the glue. The glue can adhere the support portion 51 to the first convex portion 213 and the first main body 212 to improve the connection strength between the heat-exchanging component 20 and the support component 50.

In some embodiments, the buffering layer 60 also has a heat-insulating function, which can reduce the heat exchange between the heat-exchanging component 20 and the support component 50, so as to ensure the heat exchange efficiency between the battery cells 11 and the heat-exchanging component 20.

In some embodiments, the support component 50 further includes two position-limiting portions 52, the two position-limiting portions 52 are located at a side of the support portion 51 facing to the heat-exchanging component 20 and connected to the support portion 51. In the first direction Y, the two second plate bodies 22 are located between the two position-limiting portions 52.

The position-limiting portion 52 may be integrally formed with the support portion 51, or may be connected to the support portion 51 by means of welding, riveting, bonding or the like.

A certain angle is formed between the position-limiting portion 52 and the support portion 51. Optionally, the angle between the position-limiting portion 52 and the support portion 51 may be 80°-100°.

The position-limiting portions 52 can restrict the heat-exchanging component 20 and the battery unit 10 from two sides in the first direction Y. When the battery 2 is shaken, the position-limiting portions 52 can reduce the shaking amplitude of the heat-exchanging component 20 and the battery unit 10, and improve the stability of the overall battery 2.

The position-limiting portion 52 may be connected to the second plate bodies 22 by means of riveting, bolting, welding, bonding or the like, so as to improve the overall structural strength of the battery 2 and improve stability of the overall battery 2.

In some embodiments, each of the second plate bodies 22 includes the second main body 22, the third convex portion 223 and the fourth convex portion 224, and the third convex portion 223 and the fourth convex portion 224 protrude from the surface of the second main body 222 away from the accommodating space 23. In the thickness direction of the second main body 222, the size of the third convex portion 223 protruding from the second main body 222 is smaller than the size of the fourth convex portion protruding from the second main body 222, so that the fourth convex portion 224 is pressed against the position-limiting portion 52. A second flow passage 221 is formed inside the third convex portion 223.

The two position-limiting portions 52 clamp and hold the heat-exchanging component 20 from two sides through the fourth convex portion 224, so as to increase the connecting strength between the heat-exchanging component 20 and the support component 50 and improve the stability.

In the first direction Y, the position-limiting portion 52 may overlap with the third convex portion 223, or may not overlap with the third convex portion 223. Even if the position-limiting portion 52 overlaps with the third convex portion 223 in the first direction Y, the fourth convex portion 224 can support and hold the position-limiting portion 52, so that the gap can be formed between the position-limiting portion 52 and the third convex portion 223, thereby preventing the third convex portion 223 from being pressed by the position-limiting portion 52.

Figure 16:
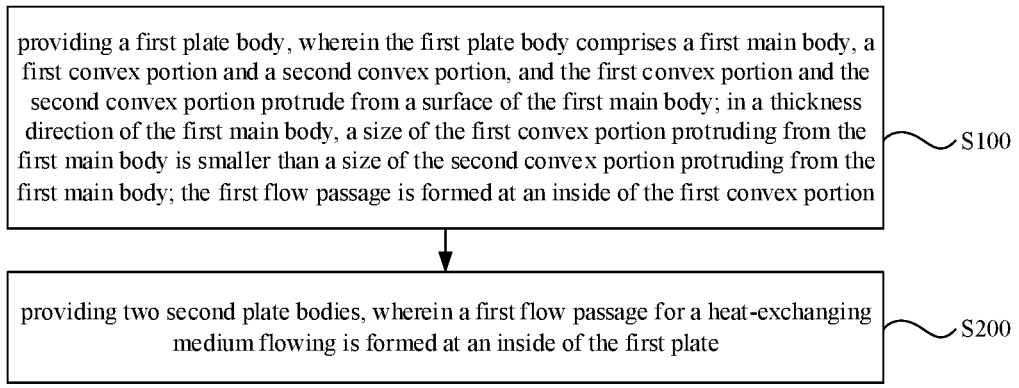
FIG. 16 shows a schematic flowchart of a method for manufacturing a battery according to some embodiments of the present application.

FIG. 16 shows a schematic flowchart of a method for manufacturing the battery according to some embodiments of the present application.

As shown in FIG. 16, the method for manufacturing the heat-exchanging component provided by the embodiments of the present application includes:

S100, providing the first plate body, in which the first plate body includes the first main body, the first convex portion and the second convex portion, and the first convex portion and the second convex portion protrude from the surface of the first main body; in the thickness direction of the first main body, the size of the first convex portion protruding from the first main body is smaller than the size of the second convex portion protruding from the first main body; the first flow passage is formed inside the first convex portion;

S200, providing two second plate bodies, in which the first flow passage for the heat-exchanging medium to flow therein is formed inside the first plate;

wherein the predetermined angle is formed between each of the second plate bodies and the first plate body, the accommodating space is enclosed by the first plate body and the two second plate bodies, and the first convex portion and the second convex portion protrude from the surface of the first main body away from the accommodating space.

It should be noted that the relevant structures of the heat-exchanging component manufactured by the above-mentioned method for manufacturing the heat-exchanging component can be referred to the heat-exchanging component provided in the above embodiments.

Figure 17:
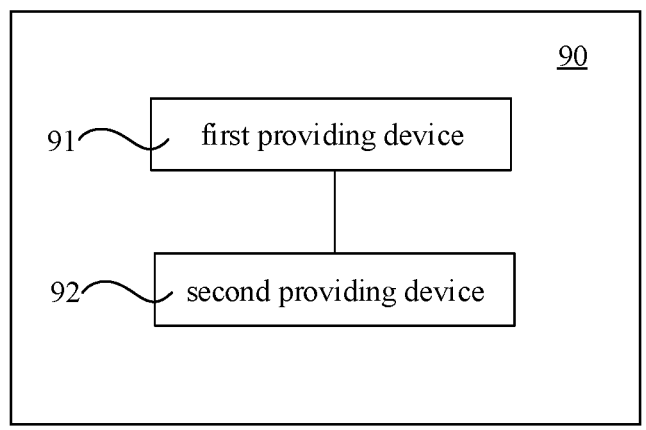
FIG. 17 shows a schematic block view of a system of manufacturing a battery according to some embodiments of the present application.

FIG. 17 shows a schematic block view of a system of manufacturing the battery according to some embodiments of the present application.

As shown in FIG. 17, the system of manufacturing the heat-exchanging component provided by the embodiments of the present application includes:

the first providing device for providing the first plate body, in which the first plate body includes the first main body, the first convex portion and the second convex portion, and the first convex portion and the second convex portion protrude from the surface of the first main body; in the thickness direction of the first main body, the size of the first convex portion protruding from the first main body is smaller than the size of the second convex portion protruding from the first main body; the first flow passage is formed inside the first convex portion;

the second providing device for providing two second plate bodies, in which the first flow passage for the heat-exchanging medium to flow therein is formed inside the first plate;

wherein the predetermined angle is formed between each of the second plate bodies and the first plate body, the accommodating space is enclosed by the first plate body and the two second plate bodies, and the first convex portion and the second convex portion protrude from the surface of the first main body away from the accommodating space.

The relevant structures of the heat-exchanging component manufactured by the above-mentioned system of manufacturing the heat-exchanging component can be referred to the heat-exchanging component provided in the above embodiments.

It should be noted that the embodiments in the present application and the features in the embodiments can be combined with one another if there is no conflict.

At last, it should be noted that the above embodiments are only used to illustrate the technical solutions of the present application, but not to limit the technical solutions; although the present application has been described in detail with reference to the embodiments as described above, those skilled in the art should understand that: it is still possible to modify the technical solutions recited in the embodiments as described above, or equivalently replace some of the technical features, but these modifications or replacements do not cause the essence of the corresponding technical solutions to deviate from the spirit and scope of the technical solutions of the embodiments of the present application.

What is claimed is:

1. A heat-exchanging component for a battery, the battery comprising a battery unit; at least part of the battery unit being accommodated in an accommodating space of the heat-exchanging component, the battery unit comprising a plurality of battery cells sequentially arranged in an arranging direction, the heat-exchanging component being configured to adjust a temperature of the battery cells, and the arranging direction intersecting with a first direction Y, and the heat-exchanging component comprising a first plate body, inside which a first flow passage for a heat-exchanging medium to flow therein is formed inside the first plate;

two second plate bodies respectively connected to two ends of the first plate body in the first direction, wherein a predetermined angle is formed between each of the second plate bodies and the first plate body, the accommodating space is enclosed by the first plate body and the two second plate bodies, and a second flow passage for the heat-exchanging medium to flow therein is formed inside the second plate bodies;

wherein the first plate body comprises a first main body, a first convex portion and a second convex portion, and the first convex portion and the second convex portion protrude from a surface of the first main body away from the accommodating space; in a thickness direction of the first main body, a size of the first convex portion protruding from the first main body is smaller than a size of the second convex portion protruding from the first main body;

the first flow passage is formed inside the first convex portion;

the first plate body and the two second plate bodies are in contact with the battery cells.

2. The heat-exchanging component according to claim 1, wherein the first plate body comprises a first base layer and a second base layer, and the second base layer is located at a side of the first base layer away from the accommodating space and attached to the first base layer;

the first convex portion is formed on the second base layer, and inside the first convex portion, the first flow passage is formed between the first base layer and the second base layer;

at a position where the second convex portion is formed, the first base layer is attached to the second base layer, the second base layer protrudes from a surface of the first main body away from the accommodating space, and the first base layer is recessed toward the second base layer to form a concave portion.

3. The heat-exchanging component according to claim 2, wherein each of the second plate bodies comprises a third base layer and a fourth base layer, and the fourth base layer is located at a side of the third base layer away from the accommodating space and attached to the third base layer;

the first base layer and the third base layer are integrally formed by a first plate, and the second base layer and the fourth base layer are integrally formed by a second plate.

4. The heat-exchanging component according to claim 3, wherein the second flow passage for the heat exchange medium flowing is formed between the third base layer and the fourth base layer, and the second flow passage communicates with the first flow passage.

5. The heat-exchanging component according to claim 1, wherein in a second direction, at least part of the first plate body protrudes from the second plate bodies and is configured to mount a joint communicating with the first flow passage, and the second direction is perpendicular to a thickness direction of the first main body and intersects with the first direction.

6. The heat-exchanging component according to claim 1, wherein an accommodating concave portion is arranged at a side of each of the second plate bodies facing to the accommodating space, the heat-exchanging component further comprises a heat-exchanging tube accommodated in the accommodating concave portion, and the second flow passage is formed inside the heat-exchanging tube.

7. The heat-exchanging component according to claim 1, wherein the second flow passage communicates with the first flow passage.

8. The heat-exchanging component according to claim 7, wherein the first flow passage communicates with the second flow passage at a junction between the first plate body and each of the second plate bodies; or the heat-exchanging component further comprises a connecting pipeline for communicating the first flow passage with the second flow passage.

9. The heat-exchanging component according to claim 1, wherein each of the second plate bodies comprises a second main body, a third convex portion and a fourth convex portion, and the third convex portion and the fourth convex portion protrude from a surface of the second main body away from the accommodating space, and in a thickness direction of the second main body, a size of the third convex portion protruding from the second main body is smaller than a size of the fourth convex portion protruding from the second main body, and the second flow passage is formed inside the third convex portion.

10. A battery, comprising the heat-exchanging component according to claim 1; and a battery unit, at least part of which is accommodated in the accommodating space of the heat-exchanging component, the battery unit comprises a plurality of battery cells sequentially arranged in an arranging direction, the heat-exchanging component is configured to adjust a temperature of the battery cells, and the arranging direction intersects with the first direction.

11. The battery according to claim 10, further comprising two end plates, wherein the two end plates are respectively located at two ends of the battery unit in the arranging direction, and clamp and hold the battery unit; two ends of each of the end plates in the first direction are respectively connected to the two second plate bodies.

12. The battery according to claim 11, wherein the end plates are located between the two second plate bodies; in the arranging direction, part of the first plate body protrudes to outside of the end plates and is configured to mount a joint communicating with the first flow passage.

13. The battery according to claim 10, further comprising a support component, wherein the support component comprises a support portion located at a side of the first plate body away from the accommodating space, and the support portion is connected to the first plate body;

the second convex portion is pressed against the support portion, and the support portion is arranged to be spaced apart from the first convex portion.

14. The battery according to claim 13, wherein a buffering layer is arranged between the support portion and the first convex portion, and the buffering layer is connected to the support portion and the first convex portion.

15. The battery according to claim 13, wherein the support component further comprises two position-limiting portions, the two position-limiting portions are located at a side of the support portion facing to the heat-exchanging component and connected to the support portion, and in the first direction, the two second plate bodies are located between the two position-limiting portions.

16. The battery according to claim 15, wherein each of the second plate bodies comprises a second main body, a third convex portion and a fourth convex portion, and the third convex portion and the fourth convex portion protrude from a surface of the second main body away from the accommodating space;

in a thickness direction of the second main body, a size of the third convex portion protruding from the first main body is smaller than a size of the fourth convex portion protruding from the first main body, so that the fourth convex portion is pressed against the position-limiting portion;

a second flow passage is formed inside the third convex portion.

17. An electricity-consuming apparatus, comprising the battery according to claim 10, wherein the battery is configured to supply electric power.

18. A method for manufacturing a heat-exchanging component, comprising providing a first plate body that comprises a first main body, a first convex portion and a second convex portion, with the first convex portion and the second convex portion protruding from a surface of the first main body, wherein in a thickness direction of the first main body, a size of the first convex portion protruding from the first main body is smaller than a size of the second convex portion protruding from the first main body, and the first flow passage for a heat-exchanging medium to flow therein is formed inside the first convex portion;

providing two second plate bodies and connecting the two second plate bodies to two ends of the first plate body in a first direction, respectively, wherein a predetermined angle is formed between each of the second plate bodies and the first plate body, an accommodating space is enclosed by the first plate body and the two second plate bodies, a second flow passage for the heat-exchanging medium to flow therein is formed inside the second plate bodies, and the first convex portion and the second convex portion protrude from a surface of the first main body away from the accommodating space;

the heat-exchanging component is applied to a battery, the battery comprises a battery unit; at least part of the battery unit is accommodated in an accommodating space of the heat-exchanging component, the battery unit comprises a plurality of battery cells sequentially arranged in an arranging direction, the heat-exchanging component is configured to adjust a temperature of the battery cells, and the arranging direction intersects with a first direction Y;

the first plate body and the two second plate bodies are in contact with the battery cells.

19. A system of manufacturing a heat-exchanging component, comprising a first providing device for providing a first plate body that comprises a first main body, a first convex portion and a second convex portion, with the first convex portion and the second convex portion protruding from a surface of the first main body; wherein in a thickness direction of the first main body, a size of the first convex portion protruding from the first main body is smaller than a size of the second convex portion protruding from the first main body, and a first flow passage for a heat-exchanging medium to flow therein is formed inside the first convex portion;

a second providing device for providing two second plate bodies and connecting the two second plate bodies to two ends of the first plate body in a first direction, respectively, wherein a predetermined angle is formed between each of the second plate bodies and the first plate body, an accommodating space is enclosed by the first plate body and the two second plate bodies, a second flow passage for the heat-exchanging medium to flow therein is formed inside the second plate bodies, and the first convex portion and the second convex portion protrude from a surface of the first main body away from the accommodating space;

the heat-exchanging component is applied to a battery, the battery comprises a battery unit; at least part of the battery unit is accommodated in an accommodating space of the heat-exchanging component, the battery unit comprises a plurality of battery cells sequentially arranged in an arranging direction, the heat-exchanging component is configured to adjust a temperature of the battery cells, and the arranging direction intersects with a first direction Y;

the first plate body and the two second plate bodies are in contact with the battery cells.

* * * * *